United States Patent [19]

Ferraiuolo et al.

[11] Patent Number: 5,246,084
[45] Date of Patent: Sep. 21, 1993

[54] BRAKE ACTUATION ADAPTATION FOR RIGHT HAND DRIVE VEHICLES

[75] Inventors: Diamond G. Ferraiuolo, Livonia; Richard C. Carter, Shelby Township, both of Mich.

[73] Assignee: Chrysler Corporation, Highland Park, Mich.

[21] Appl. No.: 989,664

[22] Filed: Dec. 14, 1992

[51] Int. Cl.$^5$ .............................................. G05G 1/14
[52] U.S. Cl. .................................... 180/323; 74/562.5
[58] Field of Search ............... 180/315, 321, 322, 325, 180/323; 74/512, 562.5, 562

[56] References Cited

U.S. PATENT DOCUMENTS

| | | | |
|---|---|---|---|
| 1,074,186 | 9/1913 | Maxfield | 74/562.5 |
| 1,805,274 | 5/1931 | Anderson | 74/512 |
| 2,542,384 | 2/1951 | Altenpohl | 74/512 |
| 4,297,550 | 10/1981 | Leighton | 74/512 |

Primary Examiner—Karin L. Tyson
Attorney, Agent, or Firm—Beverly Bunting

[57] ABSTRACT

As the automotive market becomes more global, and manufacturers are competing in many markets around the world, the need arises for a means of adapting a left hand drive vehicle to right hand drive and visa versa with a minimum of change to existing components, while at the same time maintaining comparable pedal geometry and compliance with applicable government standards. This invention provides for the flexibility of maintaining the brake booster on the left hand side of the vehicle, although not necessarily in the same location as with a left hand drive vehicle, and communicating with the brake pedal on the right hand side through a torque rod with additional links positioned on it to transfer the motion of the brake pedal to the brake booster push rod.

1 Claim, 3 Drawing Sheets

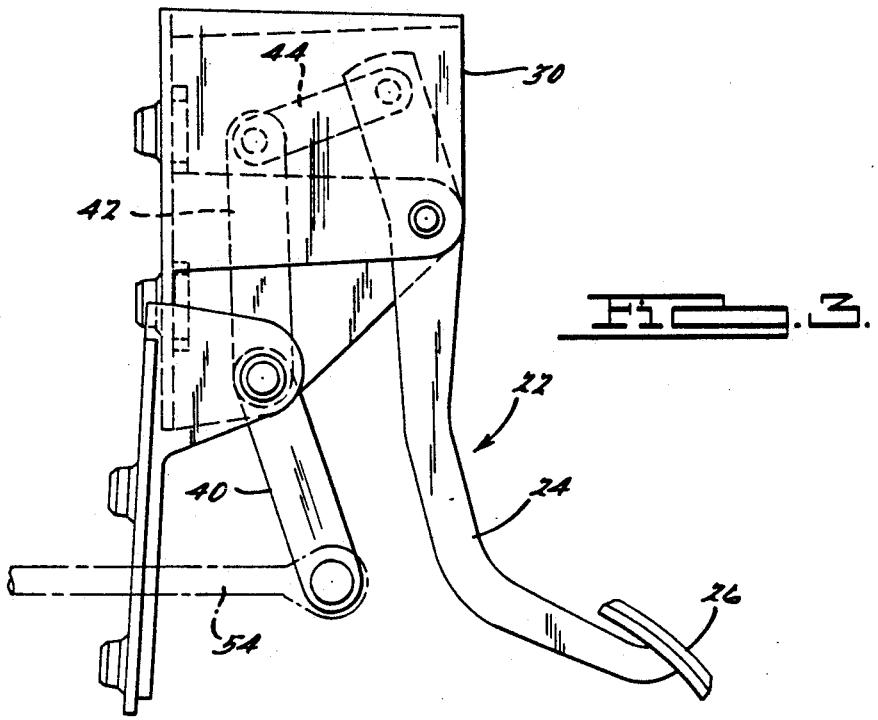
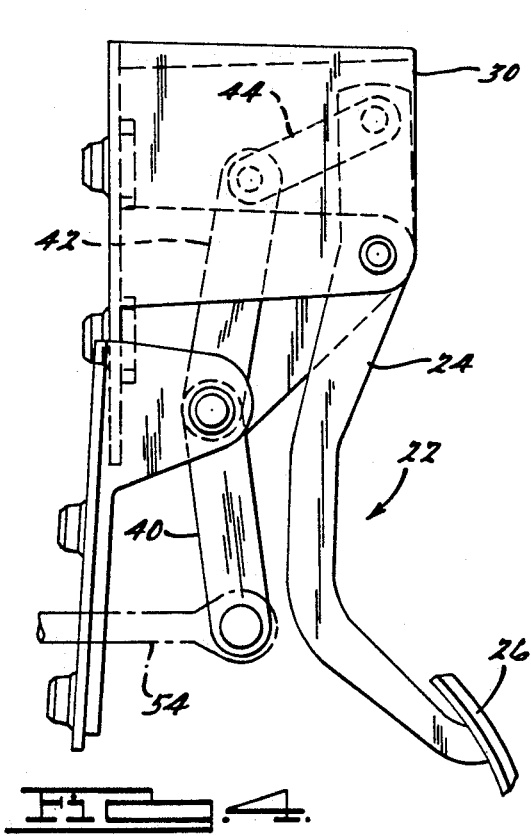
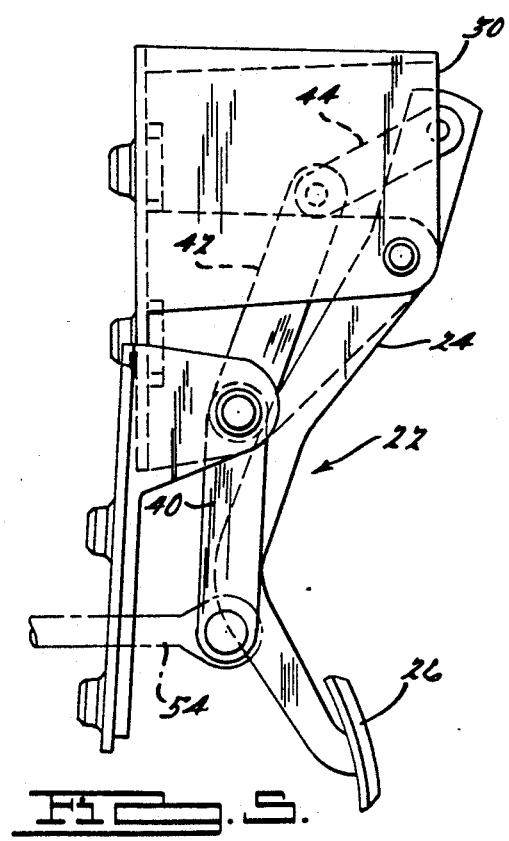

BRAKE ACTUATION ADAPTATION FOR RIGHT HAND DRIVE VEHICLES

BACKGROUND OF THE INVENTION

1. Field of the Invention

The present invention relates generally to a braking system for a right hand drive vehicle and more particularly to adaptation of a left hand drive vehicle braking system for a right hand drive vehicle.

2. Description of the Related Art

The conventional arrangement in the United States is for the vehicle driver to operate the vehicle from the left hand side of the vehicle. However, in countries such as England, Japan, and many others around the world, the driver operates the vehicle from the right hand side. In order for a vehicle manufacturer to simultaneously market and sell a particular vehicle model in the U.S. and a country with the right hand drive custom, various driver-actuated components such as the accelerator control system for controlling the speed of the vehicle, the braking system for stopping the vehicle, the steering wheel and column and the instrument panel have to be convertible between the left hand version and the right hand version.

It is advantageous to use as many common components as possible between a left hand drive system and a right hand system. This is not always possible, for example, space limitations may preclude the use of common components, or even the adaptation of one drive convention to the other.

The primary components of a typical power assisted brake system, commonly referred to as power brakes, used on a motor vehicle include a brake pedal, a master cylinder, a brake booster, and the individual brake mounted on each wheel. Power brakes are advantageous in that a vacuum operated brake booster is used to reduce the amount of force the driver must apply to the brake pedal in order the stop the vehicle. The brake booster is mounted o the engine side of the dash panel. Within the brake booster are valves actuated by a push rod externally connected to the brake pedal. As the brake pedal is depressed, the valves open and close to create a vacuum on one side of a diaphragm within the brake booster and allowing atmospheric pressure to enter on the other side. The pressure difference forces an output rod out of the brake booster against the primary piston of the master cylinder. As the piston in the master cylinder is moved, hydraulic pressure is created in the brake lines connecting the master cylinder to the individual brakes mounted on each wheel, causing the application of the brakes and a slowing down of the spinning of the wheels, until the vehicle stops.

The brake booster should be located in close proximity to the master cylinder as well as the brake pedal due to the mechanical interaction of these components. One way to adapt the brake system to right hand drive would be to reverse all brake system components from the left hand side of the vehicle to the right hand side. However, this is not always possible due to the relative size of the brake booster and master cylinder and space limitations within the engine and passenger compartments.

Another conventional arrangement is to mount the brake pedal on the right hand side of the vehicle as a mirror image of the left hand side location. The brake booster and master cylinder remain in the same location on the left hand side. One end of a torque rod is connected directly to the push rod extending from the brake booster and the other end is connected to the brake pedal. The torque rod translates the travel of the brake pedal from an at rest position, to a fully depressed position, or to any point in between, directly to the push rod.

Space limitations in the passenger compartment, for instance due to the air conditioning ductwork, may restrict placement of the brake pedal in a mirror image location on the right hand side as with a left hand drive location, or maintaining the same location of the brake booster. In this case, one option is to redesign the brake pedal. Another is to add additional linkage to the torque rod to achieve the same pedal geometry as with the left hand drive system.

Pedal geometry is the use of geometric concepts to relate the distance the push rod must travel to generate sufficient vacuum and hydraulic pressure to engage the brakes, the configuration of the brake pedal shaft, and the arc over which the brake pedal travels from an at rest position to a fully depressed position without encountering any obstacles, such as the vehicle floor. Pedal geometry may also affect pedal effort, or the amount of physical exertion required to depress the brake pedal.

A further consideration which may affect the design of the brake pedal is compliance with safety standards in the country in which the vehicle is sold. For instance, Federal Motor Vehicle Safety Standard 105, (54 FR 22905), hereby incorporated by reference, sets forth requirements that hydraulic brake systems must comply with including, minimum stopping distance and the amount of force required in applying the brakes to stop the vehicle.

SUMMARY OF THE INVENTION

This invention focuses on the adaptation of a brake system, and in particular power brakes from left hand drive to right hand drive. However, the invention also applies to an anti-lock brake system. The subject invention can be utilized equally well on a left hand drive to right hand drive conversion or a right hand drive to left hand drive conversion. For convenience, the adaption is referred to as from left hand drive to right hand drive, although a right hand to left hand drive conversion is implied.

The present invention provides an apparatus for adapting a left hand drive vehicle braking system to a right hand drive system, where it is advantageous to add additional linkage to maintain similar pedal geometry between the right hand drive and left hand drive brake pedal configuration, and it is desirable that the adaption be made with a minimum of modification to existing components.

According to a preferred embodiment of the invention, additional links are added to a torque rod so as to translate the motion of the brake pedal to the push rod. The design and placement of the additional links are such that similar pedal geometry, pedal effort and compliance with applicable safety standards compared to a conventional brake system arrangement, is achieved.

An object of the invention is to maintain brake pedal geometry and acceptable brake pedal effort while maintaining compliance with applicable safety standards.

A further object of the invention is to allow some flexibility in placement of the brake booster on the dash panel.

It is also an object of the invention to allow some flexibility in locating the brake pedal within the passenger compartment.

It is yet another object of the invention to adapt a left hand drive vehicle brake system to operation from the right hand side of the vehicle with a minimum of disruption to existing components in the engine and passenger compartments.

Other objects, features and advantages of the present invention will become more fully apparent from the following description, in light of the accompanying drawings.

DESCRIPTION OF THE DRAWINGS

FIG. 3 is an end view of the position of the brake pedal and push rod in a resting position as viewed from the left of FIG. 1;

FIG. 4 is an end view similar to FIG. 3 showing the position of the brake pedal and push rod when the brake pedal is partially depressed; and FIG. 5 is an end view similar to FIG. 3 showing the position of the brake pedal and push rod when the brake pedal is fully depressed.

DESCRIPTION OF THE PREFERRED EMBODIMENT

Figure 1:
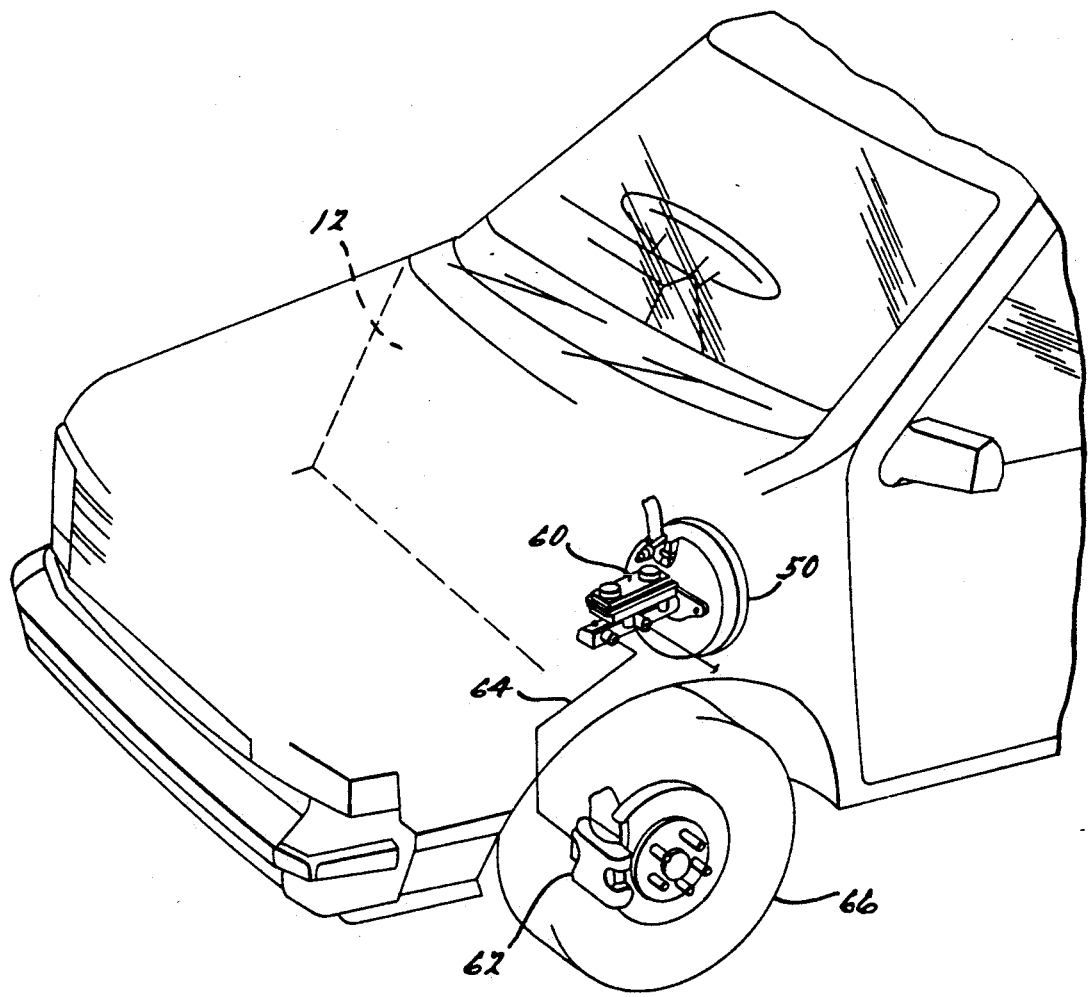
FIG. 1 is a perspective view of the brake system 1 components within the passenger compartment of a vehicle.

FIG. 1 shows a preferred embodiment of a brake system 10 adapted from a left hand drive vehicle for use in a right hand drive vehicle. The invention is equally applicable to the conversion of a brake system adapted from a right hand drive vehicle for use in a left hand drive vehicle.

In a motor vehicle, the dash panel 12 separates the engine compartment 14 from the passenger compartment 16 as well as providing structural support to the vehicle. For reference purposes, the vehicle can also be divided into the right hand side of the vehicle 18 and the left hand side of the vehicle 20 as viewed from the perspective of a person seated inside the vehicle and facing the front of the vehicle.

The primary components of the brake system 10 includes a brake pedal 22, a torque rod assembly 36, a brake booster 50, a master cylinder 60, and individual brakes 62, one being mounted on each wheel 66. The brake pedal 22 is attached to the dash panel 12 on the passenger compartment 16 side of the vehicle. The torque rod assembly 36 is connected between the brake pedal 22 and the brake booster 50 and translates the movement of the brake pedal 22 to the brake booster 50.

Figure 1A:
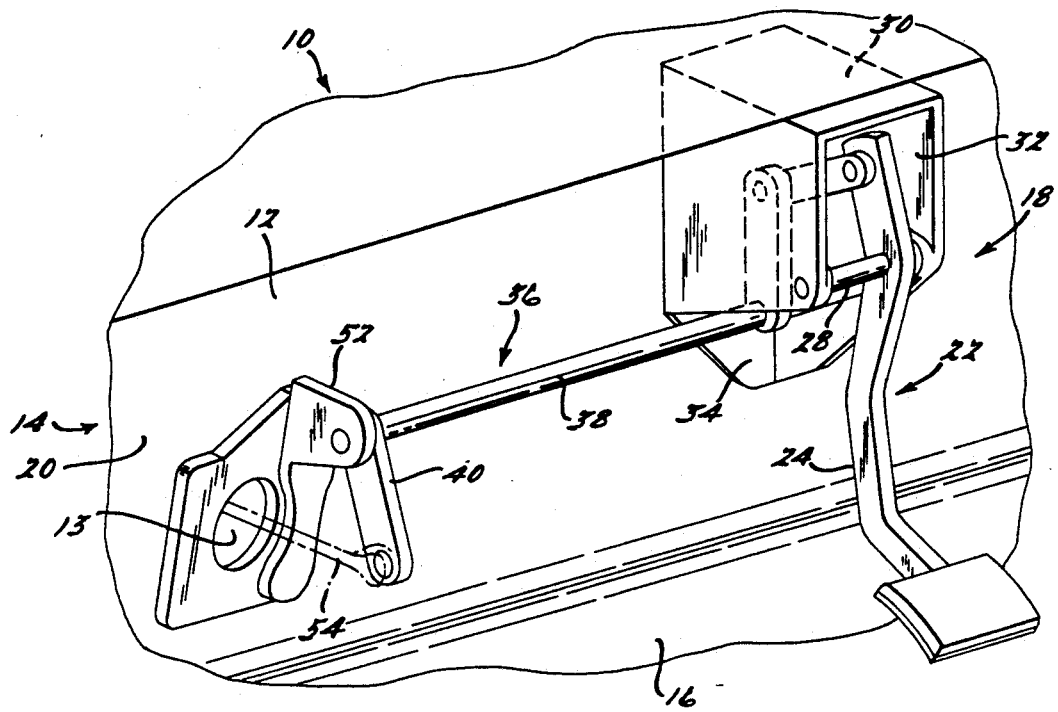
FIG. 1a is a perspective view of the brake system components of FIG. 1 as seen from the engine compartment.

FIG. 1a illustrates the brake system 10 as viewed from the engine compartment 14. The brake booster 50 is attached to the dash panel 12, the master cylinder 60 is mounted on the brake booster 50 and hydraulic lines 64 are connected between the master cylinder 60 and the individual brake 62 mounted on each wheel 66.

Figure 2:
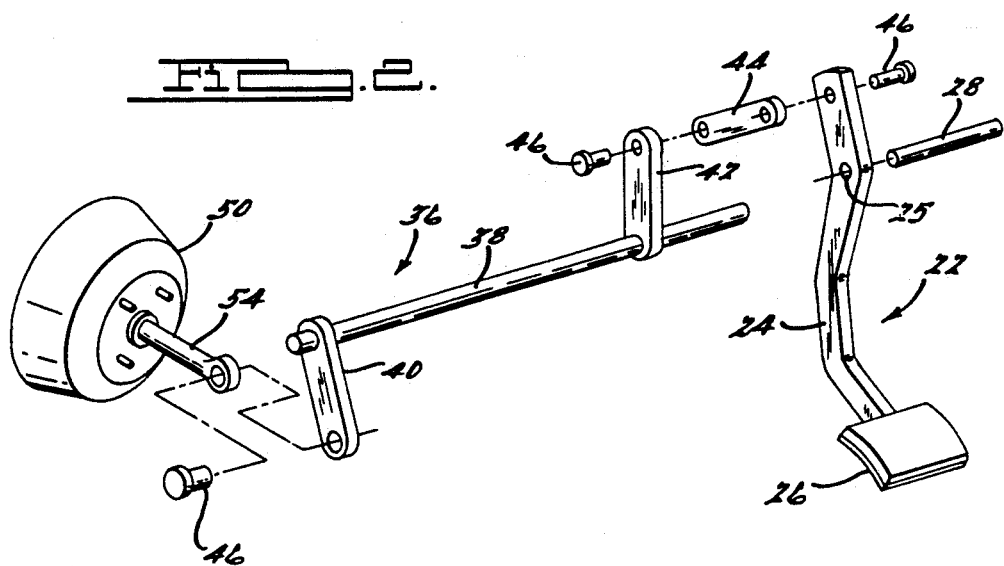
FIG. 2 is an exploded view in perspective of the brake system components of FIG. 1 within the passenger compartment.

FIG. 2 illustrates an exploded view of the actuating components of the brake system 10 found within the passenger compartment 16. The brake pedal 22 is composed of a brake pedal shaft 24 upon which a pedal pad 26 is mounted at a lower end. The driver's foot is in actual contact with the pedal pad 26. The brake pedal shaft 24 is preferably made from steel, however any material of sufficient strength and durability could be used. The pedal pad 26 may be made from plastic.

At a predetermined distance from the upper end of the pedal shaft 24 is a pivot point 25 about which the pedal shaft 24 pivots. The pivot point 25 is represented by a opening through which a pivot bolt 28 passes. The pedal shaft 24 pivots freely about the pivot bolt 28. The lengths of the pedal shaft 24 from a centerline of the pivot point 25 up to the attachment of the link 44 and down to the centerline of the pedal pad 26 are important dimensions in establishing pedal geometry.

Referring back to FIG. 1, a brake pedal support member 30 is shown. The brake pedal support 30 may provide several functions. It is a means for holding and attaching the brake pedal 22 to the dash panel 12; acts as a support for the torque rod 38; and may shield the moving parts of the brake pedal 22 from undesirable interference with foreign objects. One potential configuration of a brake pedal support 30 is shown in this embodiment. However, it is foreseeable that many shapes are possible. The primary factors affecting shape is the available space in which the brake pedal support 30 may be placed and strength and durability requirements. In this embodiment, the brake pedal support 30 is composed of two opposing side walls 32 and a rear wall 34. It is the rear wall 34 that mounts to the dash panel 12. The pivot bolt 28 is rigidly connected to each side wall 32 for support so that the pedal shaft 24 remains free to pivot about the pivot point 25. The pivot bolt 28 can be welded to each side wall 32 to provide the desired secure mounting.

As shown in FIG. 1 and FIG. 2, part of the brake booster 50, a push rod 54, extends from the brake booster 50, passes through an opening 13 in the dash panel 12 and connects to the torque rod assembly 36. The movement of the push rod 54 into the body of the brake booster 50 causes the opening and closing of valves (not shown but well known in the art) within the brake booster 50, creating a vacuum that ultimately causes a pressure difference within the brake booster 50 that forces an output rod (not shown but well known in the art) out against a primary piston (also not shown) of the master cylinder 60 The movement of the pistons within the master cylinder 60 creates the hydraulic pressure transmitted through the brake lines 64 to the brakes 62 mounted on the wheels 66 such that the spinning of the wheels 66 slows down.

In a conventional brake system 10 arrangement, the push rod 54 attaches directly to the pedal shaft 24 and the depression of the brake pedal 22 pushes the push rod 54 into the brake booster 50 as described above. One advantage of the present invention is that the brake booster 50 can be mounted in a location remote from the pedal shaft 24.

Referring back to FIG. 2, the torque rod assembly 36 is shown. The purpose of the torque rod assembly 36 is to translate the movement of the brake pedal 22 to the push rod 54 in a one-to-one manner. In this embodiment, a larger heating and cooling system was required for the vehicle, which meant larger ductwork located under the instrument panel (not shown but well known in the art) and relocation of the brake booster 50 on the dash panel 12. Therefore, it was not physically possible to align the push rod 54 directly with the torque rod 38.

In changing the relative placement of the brake booster 50, it would also be necessary to correspondingly change the relative location of the brake pedal 22 to maintain the one-to one correspondence between the brake pedal 22 and the push rod 54 to preserve the identical pedal geometry. A change in pedal geometry would affect pedal effort and potentially compliance with safety standards.

It is also conceivable that the relative placement of the brake pedal 22 may have to be modified in adapting a left hand drive vehicle to right hand drive perhaps due to packaging constraints. It is a further possibility that packaging constraints could affect the location of the torque rod 38. Therefore the present invention provides a means for preserving the pedal geometry in adapting a vehicle from one drive convention to another while introducing flexibility in the location of the brake system 10 components.

The torque rod assembly 36 is comprised of the torque rod 38, a brake booster support member 52 and supplemental linkage to achieve comparable pedal geometry and pedal effort. Support member 52 is a bracket of appropriate shape attached to dash panel 12 as shown in FIG. 1. It provides a rigid structure for holding one end of torque rod 38, and may also provide structural support to the dash panel 12.

Lower arm 40 serves as a bridge between the torque rod 38 and the push rod 54. One end of lower arm 40 is fixed near where torque rod 38 is attached to support member 52, and the other end of lower arm 40 is connected to the end of push rod 54 in a manner that avoids binding. In this embodiment, a shoulder bolt 46 is inserted through an opening in the push rod 54 and an opening in the lower arm 40 and welded at the narrow end of the shoulder bolt 46 to form a second shoulder. The length of lower arm 40 and the angle at which it is mounted relative to torque rod 38 is determined by pedal geometry.

At the opposite end of the torque rod 38, an upper arm 42 in combination with a link 44 serve as a bridge between the torque rod 38 and the pedal shaft 24. Similar to lower arm 40, the length of upper arm 42 and the angle at which it is mounted relative to the torque rod 38 is determined by pedal geometry. One end of upper arm 42 is fixed to torque rod 38 a predetermined distance from the end of the torque rod 38. The end of the torque rod 38 is attached to a side wall 32 for stability, support and rotational capability in this embodiment.

Attached to the other end of upper arm 42 is a link 44. The link 44 serves as a bridge between the upper arm 42 and the pedal shaft 24, and translates the motion of the shaft 24 to the upper arm 42. Link 44 is of sufficient length to connect the upper arm 42 with the upper end of pedal shaft The attachment of the link 44 to the upper arm 42 and the pedal shaft 24 should be such that there is no binding in the attachment points when the brake pedal 22 is actuated. In this embodiment, a shoulder bolt 46 as previously described is used.

Referring now to FIGS. 3, 4, and 5, the operation of the brake system 10 is shown. The vehicle driver is seated in the vehicle such that his foot is able to actuate the brake pedal 22 through its entire range of motion. In FIG. 3 the brake system 10 is in a resting position. Note that the push rod 38 is fully extended. As the driver depresses the brake pedal pad 26, as shown in FIG. 4, the movement of the brake pedal shaft 24 in the direction away from the dash panel 12 causes the link 44 to also move in the direction away from the dash panel 12, which causes the upper arm 42 to rotate the torque rod 38, resulting in the rotation of the lower arm 40 toward the dash panel 12 and the movement of the push rod 54 into the brake booster 50.

In FIG. 5 the brake pedal 22 is shown in a fully depressed position. The link 44 is fully extended and the push rod 54 is pushed into the brake booster 50.

It should be understood that While this invention has been discussed in connection with one particular example, those skilled in the art will appreciated that other modifications can be made without departing from the spirit of this invention after studying the specification, drawings and the following claims.

We claim:

1. In a left hand drive motor vehicle adapted for driver operation from the right hand side of the vehicle;
   a braking system for stopping the vehicle;
   a dash panel for providing structural support to the vehicle and separating a passenger compartment from an engine compartment;
   the braking system for stopping the vehicle comprising:
   a brake booster fixedly attached on the left hand side of the vehicle on the engine compartment side of the dash panel;
   a push rod operatively attached at one end to said brake booster and passing through an opening in said dash panel;
   a brake pedal support member fixedly mounted on the right hand side of the vehicle to the passenger compartment side of the dash panel and located above said push rod;
   a brake pedal having an upper end and a lower end;
   the brake pedal being pivotably mounted on the brake pedal support member intermediate the upper and lower ends of the brake pedal;
   the lower end of the brake pedal being adapted for operation by the foot of a driver to actuate the braking system;
   a torque rod having a right end and a left end;
   a brake booster support member mounted on the left hand side of the vehicle on the passenger compartment side of the dash panel;
   said torque rod extending between the brake pedal support member and the brake booster support member with the left and right ends of the torque rod rotatably supported thereby;
   a first arm fixedly secured to said torque rod adjacent the right end thereof and a second arm fixedly secured to said torque rod adjacent the left end thereof;
   said first arm extending upwardly and said second arm extending downwardly;
   means rigidly connecting the upper end of said first arm to the upper end of the brake pedal for movement therewith;
   the lower end of said second arm being pivotably connected to said push rod where by pivotable movement of the brake pedal is translated to said push rod for actuating the brake booster.

* * * * *